the catalyst at various temperatures and the percent conversion, i.e. parts by weight of $C_6$ hydrocarbons other than normal $C_6$ paraffins present in the product per 100 parts by weight of feed is tabulated below:

United States Patent Office 3,079,328
Patented Feb. 26, 1963

3,079,328
CONVERSION OF HYDROCARBONS AND CATALYST THEREFOR
Edward R. Christensen, Wappingers Falls, N.Y., assignor to Texaco Inc., New York, N.Y., a corporation of Delaware
No Drawing. Filed Dec. 29, 1959, Ser. No. 862,488
3 Claims. (Cl. 208—139)

This invention relates to the catalytic conversion of hydrocarbons and, more particularly, it relates to the catalytic conversion of hydrocarbons using a novel catalyst. The present invention is more specifically concerned with the conversion of low octane motor fuel components to higher octane motor fuel components.

One method of improving the octane rating of motor fuels is to subject the motor fuel to catalytic reforming. The term "reforming" as it pertains to the reforming of hydrocarbons includes many specific types of hydrocarbon conversion reactions and processes. For example, one of the reactions involved in reforming is the dehydrogenation of $C_6$ ring naphthenes to aromatics. Another reaction is the isomerization of alkyl $C_5$ ring naphthenes to $C_6$ ring naphthenes which can then be dehydrogenated to aromatics. Reforming also includes the isomerization of straight chain paraffins to isoparaffins and the isomerization-dehydrogenation of straight chain paraffins containing at least 6 carbon atoms to $C_6$ ring naphthenes.

It is an object of the present invention to provide a novel process for the conversion of hydrocarbons, particularly hydrocarbons boiling in the motor fuel range. Another object of the present invention is to provide a novel catalyst for the conversion of hydrocarbons. Still another object of the present invention is to provide a novel process for the preparation of a hydrocarbon conversion catalyst. These and other objects will be obvious to those skilled in the art from the following disclosure.

In one embodiment, the present invention pertains to a hydrocarbon conversion process which comprises contacting a hydrocarbon at conversion conditions with a catalyst comprising a noble metal such as platinum or palladium, a compound of boron, a combined halogen and a refractory metal oxide. In another embodiment, the present invention pertains to a novel catalyst comprising a noble metal such as platinum or palladium, a compound of boron, a combined halogen and a refractory metal oxide. In another embodiment, the present invention pertains to the preparation of a novel catalyst by treating a noble metal such as platinum or palladium supported on a refractory metal oxide with boron trifluoride.

According to one embodiment of the present invention, the conversion of hydrocarbons is carried out at elevated temperatures and pressures in the presence of a catalyst comprising a noble metal such as platinum or palladium supported on a refractory metal oxide, a combined halogen and boron oxide. The conversion is conducted at a temperature ranging from about 600 to about 1000° F., preferably 650–775° F. and a pressure ranging from about 50 to about 1000 p.s.i.g., preferably 250–600 p.s.i.g. The conversion is carried out in the presence of hydrogen, which may be introduced or recycled at a rate of from 1000 to 10,000 cubic feet per barrel of feed, 2000 to 6000 cubic feet of hydrogen per barrel of feed being preferred. The space velocity, i.e., the weight of feed per hour per weight of catalyst will normally fall within the range of 0.5–10, a space velocity of 1–4 being preferred.

The catalyst of the present invention comprises a noble metal such as platinum or palladium supported on a refractory metal oxide such as alumina, silica, magnesia or mixtures thereof containing combined halogen such as aluminum fluoride or aluminum chloride or both and also containing boria (boron oxide). In a preferred embodiment, the catalyst is composed of combined fluorine, boria and platinum on an alumina support.

Noble metal catalysts are well known in the art and are disclosed in U.S. Patent 2,479,110 to Haensel. However, the catalyst of the present invention in addition to containing, for example, platinum, a combined halogen and alumina, also contains boria. The platinum may be present in concentrations ranging from 0.01 to about 1% by weight of the total catalyst composite, a preferred range being from 0.3–0.6%. Fluorine content does not appear to be critical and may range from about 0.5 to 6% or higher. In the catalyst of the present invention it is not necessary to maintain the fluorine concentration below 3%, equally good results being obtained at fluorine concentrations above 3%. The boria concentration may range from 0.5 to 10% by weight, concentrations of from about 1 to 6% being preferred.

The catalyst of the present invention is prepared by forming a supported noble metal catalyst composite in a manner well known in the art and then treating the composite with gaseous boron trifluoride to produce a catalyst composite containing noble metal, refractory metal oxide, combined halogen and boria.

The catalyst of the present invention is admirably suited for the conversion of hydrocarbons as is evident from the following examples. In each of the examples the feedstock is a technical grade normal hexane containing approximately 96% normal hexane. Also, in each example the hydrogen rate is 4000 cubic feet per barrel of feed, the pressure is 500 p.s.i.g. and the spaced velocity is 1.

*Example I*

In this example the catalyst is a commercially obtained platinum alumina combined fluorine catalyst containing 0.4 wt. percent platinum, 0.5 wt. percent fluorine and the balance alumina. The feedstock is passed over

| Temperature, ° F.: | Percent conversion |
|---|---|
| 775 | 45.2 |
| 800 | 65.5 |
| 825 | 67.0 |
| 850 | 61.0 |
| 875 | 51.3 |

The above data show that a peak conversion of 67% is obtained at 825° F.

*Example II*

In this example the catalyst is a platinum on alumina catalyst containing 0.54 wt. percent platinum and the balance alumina. The catalyst is free from fluorine. The percent conversion at various temperatures is tabulated below:

| Temperature, ° F.: | Percent conversion |
|---|---|
| 775 | 10.4 |
| 800 | 26.4 |
| 825 | 45.0 |
| 850 | 62.1 |
| 875 | 65.5 |

*Example III*

In this example the catalyst of Example II is thoroughly mixed with dilute HF solution (0.025 g./cc.) and allowed to stand overnight. The mixture is then dried and calcined at 600° F. for 3 hours. The resulting catalyst has the following analysis: platinum 0.52 wt. percent, fluorine 3.2 wt. percent and the balance alumina. The conversion activity of this catalyst is shown below:

| Temperature, ° F.: | Percent conversion |
|---|---|
| 725 | 17.8 |
| 750 | 50.2 |
| 775 | 69.2 |
| 800 | 68.9 |

It will be noted that the highest conversion obtained from the catalyst is 69.2% at 775° F.

*Example IV*

In this example the catalyst has the following analysis: platinum 0.37 wt. percent, fluorine 6.1 wt. percent, boria 5.0 wt. percent and the balance alumina and is prepared by passing a stream of boron trifluoride through pellets of the platinum on alumina catalyst of Example I. The conversion activity of this catalyst is shown in the following table:

| Temperature, ° F.: | Percent conversion |
|---|---|
| 725 | 71.7 |
| 750 | 71.9 |
| 775 | 66.1 |

*Example V*

Example IV is repeated using the catalyst of Example II prepared in the same manner but having the following composition: platinum 0.5 wt. percent, fluorine 6.2 wt. percent, boria 7.1 wt. percent and the balance alumina. The conversion activity of this catalyst is tabulated below:

| Temperature, ° F.: | Percent conversion |
|---|---|
| 700 | 70.8 |
| 750 | 70.9 |

*Example VI*

In this example the catalyst is prepared as in Example IV but has the following analysis: platinum 0.39 wt. percent, fluorine 1.2 wt. percent, boria 2.3 wt. percent and the balance alumina. The conversion activity of this catalyst is tabulated below:

| Temperature, ° F.: | Percent conversion |
|---|---|
| 700 | 67.3 |
| 725 | 72.3 |
| 750 | 72.3 |
| 775 | 64.2 |

From the above data it will be noted that the commercial platinum-alumina-combined halogen catalyst gives a maximum conversion of 67% at a temperature of 825° F., whereas the catalysts of the present invention, i.e. catalysts containing boria in addition to platinum, alumina and combined halogen give conversions in excess of 70% at temperatures considerably below the optimum temperature for catalysts which are free from boria.

The above examples are for illustrative purposes only.

Obviously, many modifications and variations of the invention as hereinbefore set forth may be made without departing from the spirit and scope thereof and therefore only such limitations should be imposed as are indicated in the appended claims.

I claim:

1. A process for the catalytic conversion of a hydrocarbon liquid boiling in the motor fuel range and containing n-hexane which comprises contacting said liquid at a temperature between about 700 and 750° F. and a pressure between about 50 and 1000 p.s.i.g. in the presence of hydrogen with a catalyst comprising 0.5–6 weight percent combined fluorine, 0.5–10 weight percent boria and 0.1–1 weight percent platinum supported on alumina, said catalyst having been prepared by contacting a composite comprising platinum supported on alumina with boron trifluoride to effect reaction between said boron trifluoride and a portion of said alumina.

2. The process of claim 1 in which the pressure is between 250 and 600 p.s.i.g.

3. The process of claim 1 in which the catalyst contains between 1 and 6% by weight boria.

References Cited in the file of this patent

UNITED STATES PATENTS

| 2,642,384 | Cox | June 16, 1953 |
| 2,751,333 | Heinemann | June 19, 1956 |
| 2,905,626 | Sutherland | Sept. 22, 1959 |
| 2,935,545 | Block et al. | May 3, 1960 |
| 2,952,721 | Thomas et al. | Sept. 30, 1960 |